UNITED STATES PATENT OFFICE

2,332,461
ARTIFICIAL GLASS

Irving E. Muskat, Maxwell A. Pollack and Franklin Strain, Akron, and William A. Franta, Barberton, Ohio, assignors to Pittsburgh Plate Glass Company, Allegheny County, Pa., a corporation of Pennsylvania No Drawing. Application November 2, 1939, Serial No. 302,562

7 Claims. (Cl. 117—139)

This invention relates to an artificial glass and to the manufacture of such a material. In the past, numerous attempts have been made to develop a product possessing the characteristics of transparency, hardness, and temperature, solvent and wear-resistance, corresponding to that of glass and exhibiting greater flexibility and resistance to shattering than glass.

Numerous materials have been proposed for this purpose but prior to the present invention, no product has been developed which possessed all of these desirable characteristics. The well-known methyl methacrylate polymer, which has been developed in recent years, has been one of the most successful resins yet introduced as a glass substitute. However, these materials are undesirably soft and are readily scratched. Thus, in many cases, where they are used in lieu of glass, they cannot be cleaned conveniently for the reason that the surfaces thereof become seriously abraded during wiping or scrubbing operations. In addition, the surfaces of these plastics are attacked by water or organic solvents. The impairment of the surface often occurs during the use of these materials which has seriously limited the extent of their use as an artificial glass. Similar objections have been raised against most of the thermoplastic resins which have been suggested as glass substitutes.

In accordance with our invention, we have been able to provide a composite resinous product of high transparency, and stability to light which is resistant to the action of abrasives, organic solvents and which also possesses the properties of great flexibility and resistance to shattering. More particularly we have discovered that products of high flexibility, wear and scratch resistance may be secured by providing a relatively soft resinous base with a relatively harder surface or coating on one or all sides thereof. Such surfaces may be secured by providing the base with a film, coating, or layer of the harder resin which is generally of the thermosetting type such as may be derived from the polymerization of an organic compound containing two or more polymerizable groups. This compound may be applied, for example, in its monomeric or partially or intermediately polymerized form and subsequently completely polymerized to the required degree.

Applicants have been able to increase the abrasion and solvent resistance of relatively soft resins to a surprising degree. In accordance with this invention it is preferred to use as the base material a flexible resinous product which is transparent, resistant to shattering, and which possesses some degree of elasticity. Various polymers of saturated esters or amides of acrylic or α-substituted acrylic acids, such as polymerized methyl methacrylate, ethyl methacrylate, methyl methacrylamide, methyl or ethyl acrylate, methyl or ethyl chloroacrylate, or the higher esters of these acids, such as propyl, butyl, isobutyl, phenyl or stearyl esters thereof or the corresponding monoesters of polyhydric alcohols, such as ethylene glycol monomethacrylate glycerol methacrylate or mixtures of these polymers have been found suitable for base materials. Other thermoplastic polymers which are sufficiently flexible, transparent and stable to light or heat to permit their use in lieu of glass also may be coated or surfaced in accordance with our invention to provide them with hard, durable, solvent-resistant and transparent surfaces. For example, various vinyl polymers, such as polyvinyl acetate, polyvinyl chloride, polyvinyl butyrate, polystyrene, polyvinyl butyral, polyvinyl benzoate, or other fusible or other thermoplastic polyvinyl halide or ester of saturated aliphatic or araliphatic acid may be used as base materials. In similar manner, the corresponding allyl or methallyl polymers or other polymer of unsaturated alcohols or esters or ethers thereof such as polyallyl acetate, polyallyl benzoate, polyallyl butyrate, etc. may be used.

As a further modification it is found that flexible resinous products of the thermosetting type which are substantially insoluble and/or infusible and are resistant to shattering may be coated or surfaced in accordance with the present invention. Thus, polymers such as may be prepared by the polymerization of polymerizable materials containing in the monomeric form two or more polymerizable groups with other materials. Compounds, containing two or more polymerizable groups in which one group may be

and the other may be the same or another polymerizable olefinic double bond or triple bond which are separated by at least one atom so that the double bonds do not form a conjugated system, or other polymerizable group may be polymerized in the presence of plasticizers or such materials may be polymerized with other polymerizable materials which are capable of forming linear compounds such as the polymerizable compounds containing the group

and no other polymerizable groups. Thus, alkenyl esters, amides, or nitrites of polymerizable unsaturated acids containing, for example, the polymerizable group

for example, acrylic, methacrylic, chloracrylic, or other alpha-substituted acrylic acid or crotonic acid and an unsaturated alcohol such as allyl methacrylate, chloracrylate, methacrylate, etc., or the corresponding 2-chlorallyl, crotyl, methallyl, ethyl allyl, oleyl, propargyl, furfuryl, etc. esters or other unsaturated compounds containing two or more polymerizable groups such as allyl methallyl, crotyl, etc. propiolate, or the polyallyl, polymethallyl, polycrotyl, polychlorallyl, polyethyl allyl, etc. esters such as diallyl, dimethallyl, diethylallyl, dicrotyl, di-2-chlorallyl, dioleyl, esters of polybasic acids such as oxalic, maleic, fumaric, tartaric, malonic, phthalic, carbonic acids, etc., or the corresponding di- or tri- esters of phosphoric, silicic, titanic, adipic, succinic, or citric acids, or other poly esters of unsaturated alcohols and polybasic acids or monoesters of unsaturated acids such as mono allyl maleate, mono crotyl maleate, or mixed esters such as allyl crotyl maleate, phthalate, malonate, tartrate, etc. may be copolymerized with compounds capable of forming linear polymers. Suitable compounds polymerizing to form the so-called "linear" polymer which may be used for polymerization in accordance with the present invention are vinyl or allyl polymers such as vinyl chloride, styrene, vinyl propionate, vinylidene chloride, vinyl acetate, allyl benzoate, allyl acetate, mono allyl phthalate, allyl methyl phthalate, polymers of methallyl, chlorallyl, crotyl, ethyl allyl or oleyl alcohol or esters or ethers thereof, or other compounds capable of polymerizing to form a polymer of an unsaturated alcohol or ester, or ether, or a polymer of an unsaturated acid or ester, or amide, such as polymers of saturated esters of acrylic, chloracrylic or methacrylic acid or crotonic acid, for example, methyl, ethyl, propyl, butyl, amyl, lauryl, or stearyl acrylate, methacrylate, chloracrylate, or crotonate. Similar polymers may be secured by polymerizing unsaturated polyesters of polyhydric alcohols such as glycol, glycerol, mannitol, di, tri, or poly acrylate, methacrylate, crotonate, chloracrylate, etc. Copolymers which may be suitable for use as the base plastic in accordance with the present invention have been described in United States patents granted to Benjamin Garvey, Nos. 2,155,590 and 2,155,591, and also to United States Patents Nos. 2,160,931, 2,160,932, 2,160,940, 2,160,941, 2,160,942, and 2,160,943.

In similar manner, polymers of varying hardness may be obtained by polymerizing the above agents in the presence of a quantity, generally from 10 to 70 percent of a compatible plasticizer such as dibutyl phthalate or other phthalates such as ethyl, propyl, isopropyl, butyl, isobutyl, cyclohexyl or butyl phthalates; phosphates, such as tricresyl phosphate, esters of polyhydric alcohols, such as the glycol or glycerol esters, tributyrin, triacetin, glycol benzoate, or substituted amides, such as tetraethyl phthalamide, or other hydrocarbons such as alkyl naphthalenes, amyl naphthalene, dixylyl ethane, etc. In this manner it is possible to produce products which possess great flexibility. Similarly, numerous materials such as oleyl methacrylate, oleyl chloracrylate, etc. which may be polymerized alone to form flexible products without plasticizers may be used as base materials.

Most efficient results have been secured by use of a coating of a polymer of the unsaturated esters of acrylic and α-substituted acrylic acids or the polyhydric alcohol polyesters of these acids or the corresponding amides thereof, such as allyl acrylate, allyl methacrylate, allyl chloracrylate, methallyl acrylate, methallyl methacrylate, methallyl chloroacrylate, ethyl methacrylate, crotyl methacrylate, 2-chloroallyl acrylate, 2-chloroallyl methacrylate, oleyl methacrylate, vinyl acrylate, vinyl methacrylate, resorcinol dimethacrylate, glycol dimethacrylate, glycol diacrylate, glycerol di- or trimethacrylate or mixtures thereof, or polyglycol diacrylates, glycerol di- or triacrylate or the acrylic, methacrylic, or alpha-chloracrylic esters of the higher polyhydric alcohols, such as sorbitol or mannitol wherein at least two of the hydroxyl groups are esterified with the above named acids.

Other products may be secured by surfacing with polymers of other organic compounds which contain at least two polymerizable groups preferably those in which one of the groups is the polymerizable group

and is separated by at least one atom whereby the groups are unconjugated. For example, unsaturated aliphatic esters of unsaturated aliphatic acids, such as the unsaturated crotonate esters, allyl crotonate, crotyl crotonate, methallyl crotonate, oleyl crotonate, 2-chlorallyl crotonate, ethylallyl crotonate, or other unsaturated esters, such as allyl oleate, allyl itaconate, allyl propiolate, diallyl maleate, allyl ethyl maleate, dimethallyl maleate, ethyl methallyl maleate, methyl allyl maleate, vinyl allyl maleate, divinyl maleate or other mono or polyester formed by esterification of maleic or fumaric acid or their substituted derivatives with an unsaturated alcohol or allyl citraconate, allyl fumarate, methallyl fumarate, oleyl fumarate, allyl cinnamate or the corresponding methallyl, ethyl allyl, or crotyl esters thereof, or the unsaturated polyesters of saturated polybasic acids and unsaturated monohydric alcohols such as diallyloxalate, diallyl malonate, di- or triallyl citrate, diallyl tartarate, diallyl phthalate, diallyl carbonate, etc., or the corresponding methallyl or crotyl esters thereof may be used for this purpose. Similarly, the polyesters of polyhydric alcohols and monobasic unsaturated esters such as ethylene glycol dicinnamate, glycerol dicinnamate, glycerol dipropiolate, glycol dipropiolate, or the corresponding esters of other glycols such as the propylene glycols, butylene glycols, or polyglycols thereof or the higher alcohols such as sorbitol or mannitol, etc. may be polymerized in this manner. Other organic oxygen compounds which contain at least two polymerizable double bonds and are capable of polymerizing to a final form which is transparent, hard and substantially infusible and insoluble may be used. Thus, unsaturated polyethers of polyhydric alcohols, such as the diallyl, -methallyl, -oleyl, or -crotyl ethers of glycols, such as ethylene, propylene, or butylene glycol or polyglycols such as diethylene glycol, tetraethylene glycol, etc. or the di- or triallyl, methallyl, oleyl, or crotyl ethers of glycerol or the corresponding polyethers of the higher polyhydric alcohols, such as mannitol or sorbitol may be applied and polymerized in accordance with our invention. In addition, esters of inorganic acids such as diallyl sulphate, di- or triallyl phosphate, di- or triallyl borate, dior triallyl phosphite, allyl silicates, allyl titanates, or similar esters may be polymerized by our process.

In order that a product of maximum surface hardness be produced, it is preferable to make use of compounds wherein the number of carbon atoms in the molecule of the monomeric form is not excessive. Thus, a methacrylate polymer which is surfaced with polymeric allyl or methallyl methacrylate or chloracrylate exhibits a greater resistance to wear and is harder than a similar polymer which is surfaced with polymeric oleyl methacrylate. The trend toward softer products as the number of carbon atoms increase may be minimized by increasing the number of polymerization double bonds in the composition. Thus, sorbitol hexamethacrylate polymerizes to form a product which exhibits greater hardness than does polymeric oleyl methacrylate. In general, it is preferred to make use of agents wherein the ratio of the number of carbon atoms to the number of polymerizable olefinic groups does not exceed 15 and preferably materials wherein this ratio does not exceed 8 are made use of. In addition, it is found that most desirable products are secured through use of materials containing not in excess of 10 carbon atoms, in each of the alcohol residues and the acid residues. In contrast, the softer polymers may be used as base materials.

The plastic base may be coated in the proper manner and under predetermined conditions of operation with a monomer or a partially polymerized material or solution or dispersion thereof, and the coated product treated to complete polymerization of the surface by means of heat and/or light and/or catalysts with or without pressure. It has been found that the application of the coating may be most effectively controlled by applying the surfacing agent in its intermediate fusible, polymeric stage to the thermoplastic base and completing the polymerization. It has been discovered that polymerizable compounds, such as those which are contemplated herein and which ordinarily polymerize to form infusible, insoluble products, may, under proper conditions, be polymerized to form a soluble, thermoplastic polymer which may be polymerized further to the infusible state.

A fusible polymer of this type may be prepared for example by conducting polymerization in a solution which is capable of dissolving the polymer and interrupting polymerization at the proper time. Thus, when a polymerizable compound containing two or more polymerizable groups, such as allyl chloracrylate, allyl methacrylate, etc., is dissolved in a solvent such as acetone, dioxane, chloroform, etc., a soluble polymer is initially formed, but as polymerization proceeds, the insoluble polymer is produced and the solution is converted into a non-reversible gel. By interrupting polymerization before the gel is formed, a soluble, fusible polymer may be secured. This polymer is found to be soluble in a majority of the solvents in which the polymer of the saturated acrylate or vinyl esters are normally soluble. Acetone, chloroform, toluene, dioxane, triacetin, phenyl cellosolve, ethyl cellosolve acetate, benzene, etc., are suitable solvents, in general. The fusible polymers may be recovered by evaporation or distillation of the solvent, by addition of a non-solvent, such as methyl, or ethyl alcohol or water.

In accordance with one effective method of interrupting polymerization, inhibitors, such as pyrogallol, hydroquinone, aniline, phenylene diamine, sulphur, thiophenol, organic, or inorganic salts or complexes of the reduced forms of metals, such as copper, manganese, cobalt, nickel, etc., may be added to the polymer during polymerization or before polymerization has been initiated. These solutions may be treated to remove the solvent by slow evaporation, treatment with a non-solvent, or by other suitable method and fusible thermoplastic polymers which may be molded, machined, cut, bent or otherwise worked into desirable forms thereby attained. During shaping or after final shaping, the products may be completely hardened and rendered infusible by suitable methods hereinafter more fully set forth.

In the polymerization of allyl and methallyl esters of acrylic and alpha-substituted acrylic acid, such as allyl methacrylate, it has been found that the yields of fusible polymer appears to be dependent to a great extent upon the concentration of the monomer in the solution undergoing polymerization. Thus, when very concentrated solutions containing a large quantity, for example, in excess of 40-50 percent, of the monomeric allyl or methallyl methacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight are used substantially higher yields of the fusible polymer may be secured. Accordingly, it is preferred to deal with solutions having a monomer concentration below 40 percent by weight.

The yield of fusible polymer appears to be increased by treating the solutions at increased temperatures and increased catalyst concentrations. Thus, substantially greater yields may be secured by polymerizing allyl methacrylate solutions at 100° C. or above, than may be secured at 60° C. Catalyst concentrations up to 5 percent or more may be used in some cases. In general, conditions favoring the formation of lower molecular weight polymers appear to result in increased yields of fusible products.

In many cases, the fusible polymer may be obtained by conducting the polymerization in the substantial absence of solvents. This is particularly true in the production of fusible polymers from those materials which polymerize slowly, for example, the unsaturated crotonic acid esters, such as allyl or methallyl crotonate or the corresponding phthalates, maleates, oxalates, itaconates, etc. In some cases it is found desirable to partially polymerize the polymer in the absence of solvents and subsequently to recover the fusible polymer by dissolving the product in a suitable solvent such as acetone and precipitating the fusible material with a non-solvent, such as water or methyl alcohol. In many cases, however, the residual monomer may be removed by distillation at low temperatures in a vacuum. This process is particularly effective in dealing with materials which polymerize to form viscous products which retain a substantial quantity of unpolymerized monomer.

In coating thermoplastic bases, such as polymers derived from methyl methacrylate with the fusible convertible polymer, the polymer is generally applied as a solution which is allowed to evaporate to form a film. The fusible polymers of the type herein described are soluble in the solvents which are generally used for other fusible vinyl polymers, such as acetone, carbon tetrachloride, trichloro ethylene, tetrachloroethylene, xylene, toluene, benzene, dioxane, chloroform, triacetin, phenyl cellosolve, etc. After the film has dried, the product may be subjected to polymerization conditions in order to convert the surface film to the infusible state. Pressure may be applied to the film in order to promote adhesion and impart smoothness to the surface.

In order to insure the production of a transparent sheet which is free from surface defects and which possesses a coating having optimum adhesion, it is preferred that the infusible polymer be present as a very thin film. Preferably, this film should be of such thinness that a pressure which is just sufficient to cause the base plastic to yield will also cause the film to yield in a corresponding manner without fracture or impairment of the film. In applying films, such as allyl methacrylate, etc., to polymethyl methacrylate, it is found that optimum results may be secured by application of not substantially in excess of 20 milligrams of the coating material per square foot of methacrylate surface to be coated. The films thus produced are below about 0.01 inch in thickness, being in general, about 0.0003 inch thick, in most cases. Where allyl methacrylate or similar agent is used as the coating, the films preferably are less than 0.0002 inch in thickness. It is to be understood, however, that the critical thickness for maximum hardness and adhesion varies with the composition of the plastic base, plasticizers used therein, flexibility thereof, etc., and that products having substantially greater thickness may be produced, if desired.

By use of a film of such thickness it is possible to obtain a product of unusual scratch resistance which is superior to the scratch resistance of any single polymer. To a large degree this is due to the higher flexibility of thin films and to the fact that the flexible thin films when in close adherence to the base plastic possess great resiliency and elasticity and resist penetration. The polymers derived from allyl methacrylate and similar materials are not only harder than polymers of methyl methacrylate but also are somewhat more rigid and brittle. Thus, where the film is relatively thick, a stress applied at some point on the surface thereof is not transmitted to the plastic below the film at any single point. In consequence, when a weighted point is drawn across such a thick film, the film itself takes up most of the weight of the point and the scratch resistance of the surface thereof is merely the scratch resistance of the material of the film.

In contrast, when a weighted point is drawn across the surface of a coated plastic having a thin film of the surfacing polymer, both the base polymer and the surface polymer cooperate in resisting deformation under the point, some of the stress being transmitted to each. Since the film is thin, it is sufficiently flexible to conform to small deformation of the base without fracture and since it resists penetration, scratching by the weighted point is thereby avoided.

Stress applied to a localized portion of such a coated sheet may result in a transient yielding of the surface thereof, but upon release of the applied stress the base by reason of its elasticity returns to its original form and, since the film remains unfractured and unpenetrated, the coated product remains unscratched and undeformed. In general, the thin films used in accordance with this invention are not fractured until the base is deformed to a visible, substantially permanent degree. In many cases the coated sheets have been bent to an angle of 10 or more degrees without apparent fracture or impairment of the film. Artificial glass products having thin film surfaces as herein described exhibit a scratch resistance which is several times that independently exhibited by either the base polymer or the coating polymer.

In some cases, difficulty may be encountered in securing a coating which is sufficiently adherent and free from fractures or other surface defects for commercial use. Difficulties of this nature are often encountered in applying unsaturated acrylates, such as allyl methacrylate to cellulose thermoplastics, such as cellulose acetate. In such a case, it may be desirable to provide the thermoplastic with an intermediate coating of a more mutually compatible composition, such as a coating of cellulose nitrate.

The products produced in accordance with this invention are unusually hard and possess the transparency of the plastic base. The resistance to abrasion and scratch of these materials compares closely to abrasion and scratch resistance of glass.

The following examples are illustrative:

*Example I.*—A mixture of 75 parts by weight of benzoyl peroxide, 225 parts by weight of monomeric allyl methacrylate and 1275 parts by weight of acetone was refluxed at 63° C. for three hours. 2800 parts by weight of methyl alcohol was then added to the mixture. The resulting mixture was then poured, with stirring, into 1000 parts by weight of a methyl alcohol-water mixture containing 80 percent of methyl alcohol by volume. The precipitate thus formed was coagulated and recovered from solution.

A sheet of commercial molded "Lucite" which is a commercially available polymer of methyl methacrylate was pressed between smooth plates in order to render the surface more homogeneous and smooth. A xylene solution containing 5.5 grams of polymer per 100 cc. of solution was poured and spread evenly over the surface of the pressed plastic. 14.4 cc. of solution was applied per square foot of surface and the coated product was air-dried for 35 minutes. The "Lucite" sheet was then coated on the opposite side in the same manner and was then pressed between glass plates at a pressure of 1000 lbs. per sq. in. and at a temperature of 150° C. for 40 minutes. The coated sheet thus produced was colorless, transparent, and free from surface defects. In order to compare its scratch resistance with glass, a diamond point pencil weighted with varying weights was applied to sheets of glass and the coated "Lucite" prepared in accordance with this sample. It was observed that heavier weights were required to produce visible scratches on the coated "Lucite" than were required to produce such scratches on glass. The abrasion-resistance of the coated product to falling 40–60 mesh silica sand, using the apparatus described in "Physical and Chemical Examination of Paints, Varnishes, Lacquers and Color" by Gardner, 6th Edition, page 222–223, was found comparable to that of glass rather than to that of uncoated "Lucite."

*Example II.*—55 parts by weight of allyl chloroacrylate was heated with 3 parts by weight of benzoyl peroxide and 350 parts by weight of acetone at a temperature of 60° C. for 4 hours.

At this time, 300 parts of methanol were added to produce turbidity, and the resulting mixture was poured slowly, with stirring, into 1600 parts of methanol. The white voluminous precipitate thus formed was filtered and dried, and was soluble in acetone and chloroform and softened at 110–125° C. It was a highly plastic gum at 140–150° C., hardening with further heating.

A sheet of polymerized methyl methacrylate was coated with a xylene solution containing 5.5 grams of this polymer and 0.5 gram of benzoyl peroxide per 100 cc. of solution as described in Example I and the coated product was heated between glass plates to 140° C. at a pressure of 875 pounds per square inch for six minutes. The product obtained was clear and free from surface defects and its resistance to scratch was comparable to that of the product produced in accordance with Example I.

*Example III.*—45 grams (0.5 mole) of anhydrous oxalic acid, 116 grams (2.0 moles) of allyl alcohol, and 3.2 grams of p-toluene-sulfonic acid were heated together at 130–140° C. for 22 hours. The water and excess alcohol were then removed by slow distillation. The diallyl oxalate was then distilled at a temperature of 106–107° C., under a pressure of 6 mm. of mercury.

A sample of diallyl oxalate containing 5 percent by weight of benzoyl peroxide was heated in a closed tube at 150° C. for 35 hours at which time the viscous solution was poured into methyl alcohol to recover the fusible polymer. A solution containing 5.5 grams of the fusible polymer and 0.5 gram of benzoyl peroxide per 100 cc. of solution was applied to the surface of a sheet at 150° C. under a pressure of 1200 pounds per square inch for 10 hours. The cured sheet possessed a hard, solvent-resistant surface.

*Example IV.*—A quantity of monomeric ethylene glycol dicrotonate was heated with 5 percent by weight of benzoyl peroxide at 150° C. until the solution became viscous. The solution was then cooled to room temperature and introduced into an equal portion of acetone and the fusible polymer was precipitated with methyl alcohol as in Example I. A coating of a 5 percent solution of this polymer containing 0.5 percent benzoyl peroxide was applied to the surface of a polymer of methyl methacrylate copolymerized with sufficient allyl crotonate to render the product insoluble. After this coating was dried the coated polymer was placed in a mold and heated to a temperature of 150° C. for 2 hours, at a pressure of 1000 pounds per square inch. The article possessed a hard, solvent-resistant surface.

*Example V.*—A 15 percent solution of glycol dimethacrylate dissolved in acetone and containing 1 percent benzoyl peroxide was refluxed for 2 hours. The solution was then treated with methyl alcohol as described in Example I and a white acetone soluble precipitate was produced.

A xylene solution containing 5.5 grams of this precipitate per 100 cc. of solution was applied to the surface of a sheet of a copolymer of 85 percent methyl methacrylate and 15 percent of allyl methacrylate in the manner described in Example I and a product having a hard, wear-resistant surface was thereby secured.

*Example VI.*—A quantity of monomeric allyl crotonate was heated in a stream of air at a temperature of 150–160° C. until the liquid began to get viscous. The liquid was then dissolved in acetone and the fusible polymer was precipitated with methyl alcohol in the manner described in Example I. The precipitated polymer was recovered as a white, gummy mass which dried to form a white, acetone soluble powder. A 5 percent solution of this powder containing 0.5 gram of benzoyl peroxide in xylene was applied to a sheet of polymeric methyl acrylate and cured in a mold at a pressure of 1,000 pounds per square inch at a temperature of 140° C. for 2 hours. The resulting product possessed a hardened, solvent-resistance surface.

*Example VII.*—A sheet of cellulose acetate was coated with a film of nitrocellulose and then coated with fusible allyl methacrylate in the manner described in Example I and a sheet having a hard, solvent-resistant surface was thereby secured.

*Example VIII.*—A quantity of diallyl phthalate was prepared by heating a mixture of allyl alcohol and phthalic anhydride, which contained allyl alcohol in an amount slightly in excess of the theoretical amount required for diallyl phthalate, to a temperature of 90–95° C. in the presence of 2 percent paratoluene-sulphonic acid for 15 hours. The mixture was washed with 0.1 N sodium hydroxide solution to remove acid and unreacted material and the diallyl phthalate was recovered by distillation at a pressure of 6 millimeters and a temperature of 170° C.

One part by weight of diallyl phthalate was heated at 150° C. for two and one-half hours and was then dissolved in two parts by weight of acetone. Methyl alcohol was added to the solution in an amount required to completely precipitate the polymer. This polymer was then redissolved to form a 10 percent solution of acetone which contained 1 percent benzoyl peroxide, and a sheet of polymerized methyl methacrylate was dipped into the solution. The dipped sheet was then heated at a temperature of 150° C. under a pressure of 1,000 pounds per square inch for 4 hours. The resulting product possessed a hardened, solvent-resisting surface.

*Example IX.*—A quantity of ethyl allyl maleate was heated with one percent benzoyl peroxide at 130° C. for 15 minutes, when the product began to grow viscous heating was then discontinued and sufficient methyl alcohol was added to completely precipitate the polymer. The polymer was then redissolved in acetone to form a 5 percent solution thereof which contained 0.5 percent of benzoyl peroxide. This solution was applied to a sheet of polymeric methyl methacrylate and the sheet was heated in a mold at 150° C. under a pressure of 1,200 pounds per square inch for 6 hours, whereby a product having a hardened, solvent-resistant surface was secured.

*Example X.*—15 cc. of the xylene solution of the allyl methacrylate polymer described in Example I was applied to each square foot of surface of a sheet formed by the cast polymerization of a mixture of 80 parts of vinyl acetate, 20 parts of diallyl succinate and 5 parts of benzoyl peroxide and curing at 120° C. The product was dried and cured under pressure of 1,000 pounds per square inch for one hour.

*Example XI.*—A xylene solution of glycol dimethacrylate prepared as described in Example V was applied as in Example I to the surface of a copolymer formed by copolymerizing 50 parts of diallyl maleate and 50 parts of methyl methacrylate and the coated product was dried and cured as described as in Example I.

Although the present invention has been described and claimed with reference to the specific details of certain embodiments thereof, it is not intended that such details shall be regarded as limitations upon the scope of the invention except insofar as included in the accompanying claims. This application is a continuation-in-part of our copending application Serial No. 257,135, filed February 18, 1939.

We claim:

1. An artificial glass which comprises a sheet of light transmitting substantially rigid resin which is a copolymer of a thermoplastic resin and a resin containing in its monomeric form at least two polymerizable unsaturated organic radicals, said sheet of copolymer being surfaced with a layer of a polymer of a compound which in its monomeric form contains two unsaturated polymerizable groups separated by at least one oxygen linkage, said layer being less than 0.01 inch in thickness.

2. An artificial glass which comprises a sheet of light transmitting substantially rigid resin which is a copolymer of a thermoplastic resin and a polymeric resin containing in its monomeric form at least two polymerizable unsaturated organic radicals, said sheet of co-polymer being surfaced with a thin layer of a polymer of an unsaturated alcohol ester of an acid of the group consisting of acrylic and alpha substituted acrylic acids, said layer being less than 0.01 inch in thickness.

3. The composition of claim 1 in which the surface layer is allyl methacrylate.

4. The composition of claim 1 in which the surface layer is methallyl methacrylate.

5. The composition of claim 1 in which the surface layer is chloroallyl methacrylate.

6. The composition of claim 2 in which the base material is a copolymer methylmethacrylate.

7. The composition of claim 2 in which the base material is a copolymer of methyl methacrylate and the surfacing material is allyl methacrylate.

IRVING E. MUSKAT.
MAXWELL A. POLLACK.
FRANKLIN STRAIN.
WILLIAM A. FRANTA.